United States Patent
Crosby et al.

(10) Patent No.: US 6,330,285 B1
(45) Date of Patent: *Dec. 11, 2001

(54) VIDEO CLOCK AND FRAMING SIGNAL EXTRACTION BY TRANSPORT STREAM "SNOOPING"

(75) Inventors: Philip S. Crosby, Portland; Charles H. Van Dusen, Beaverton; Venkataraman Prasannan, Portland; James L. Gimlett, Tigard, all of OR (US)

(73) Assignee: Tektronix, Inc., Beaverton, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,620

(22) Filed: Feb. 11, 1998

(51) Int. Cl.[7] ............................................... H04B 1/66
(52) U.S. Cl. ..................................... 375/240.28; 370/509
(58) Field of Search ............................. 348/845.2, 423, 348/565, 419, 464, 425.4, 425.2, 845.3, 423.1; 371/47.1; 370/509, 468, 516, 253, 395, 473; 375/376, 368, 240.28, 240.27

(56) References Cited

U.S. PATENT DOCUMENTS

| | | | |
|---|---|---|---|
| 5,467,342 | * 11/1995 | Logston et al. | 370/253 |
| 5,598,415 | * 1/1997 | Nuber et al. | 348/465 |
| 5,699,124 | * 12/1997 | Nuber et al. | 348/845.2 |
| 5,699,392 | 12/1997 | Dokic . | |
| 5,726,989 | * 3/1998 | Dokic | 348/423 |
| 5,734,429 | * 3/1998 | Jung | 348/423 |
| 5,742,623 | * 4/1998 | Nuber et al. | 371/47.1 |
| 5,754,233 | * 5/1998 | Takashima | 348/423 |
| 5,801,785 | * 9/1998 | Crump et al. | 348/565 |
| 5,808,722 | * 9/1998 | Suzuki | 348/423.1 |
| 5,818,539 | * 10/1998 | Naimpally et al. | 348/512 |
| 5,844,600 | * 12/1998 | Kerr | 348/17 |
| 5,859,949 | * 1/1999 | Yanagihara | 386/68 |

* cited by examiner

Primary Examiner—Chris Kelley
Assistant Examiner—Gims Philippe
(74) Attorney, Agent, or Firm—Francis I. Gray

(57) ABSTRACT

An apparatus for video clock and framing signal extraction by transport stream snooping parses MPEG2 Transport Packet headers from a transmission transport stream and partially decodes the headers to identify those corresponding to a specified packet identification (PID). From the specified headers a program clock is decoded and compared with a recovered program clock generated by a local clock oscillator and a local clock counter. The comparison is used to finely tune the recovered program clock frequency. Also from the heads video framing information is decoded, and such framing information and the recovered program clock are used to generate a video reference signal.

4 Claims, 2 Drawing Sheets

VIDEO CLOCK AND FRAMING SIGNAL EXTRACTION BY TRANSPORT STREAM "SNOOPING"

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates to compressed video systems, and more particularly to video clock and framing signal extraction from a compressed video transport stream by "snooping".

Video and related signals now may be interrelated through their inclusion as members of a functional group. An example is the "Transport Stream" syntax described in ISO/IEC 13818-1, commonly known as the MPEG-2 Stream specification. While this standard describes a means of separating these component or elementary signals and extracting a timebase that may be common to them, video and audio facilities may have a requirement that has greater scope—the synchronization of most or all signals within the facility with a selected incoming or outgoing Program Stream.

In a large facility the place where a given Transport Stream is likely to be decoded is uncertain, and may change according to the tasks being performed within that facility. Furthermore the cost of fully decoding such a stream is considerable.

The content of video production facilities is expected to pass through a network interface device (NID) connecting that facility to a more general telecommunication network. Such a network is likely to use some form of asynchronous, packet-based protocol such as Asynchronous Transfer Mode (ATM). This uncovers an additional need—that of determining for network management purposes the errors in the arrival times of incoming ATM packets.

What is required is an economical means of providing a unified timing means at a content facility and of providing data that may be used for intelligent network management.

BRIEF SUMMARY OF THE INVENTION

Accordingly the present invention provides for video clock and framing signal extraction by Transport Stream "snooping". A transmission transport stream, such as an Asynchronous Transfer Mode (ATM) transport stream, is parsed to extract MPEG-2 Transport Packet headers. The extracted headers are partially decoded to identify those having a reference packet identification. From the identified headers a program clock is decoded and compared with a recovered program clock generated from a local clock oscillator and local clock counter. The comparison serves to finely tune the local clock oscillator about a nominal frequency, such as 27.000 Mhz. The recovered clock frequency may be used for facility timing, and may be used together with framing information decoded from the headers to generate a reference video signal such as a genlock signal.

The objects, advantages and other novel features of the present invention are apparent from the following detailed description when read in conjunction with the appended claims and attached drawing.

DETAILED DESCRIPTION OF THE INVENTION

Figure 1:
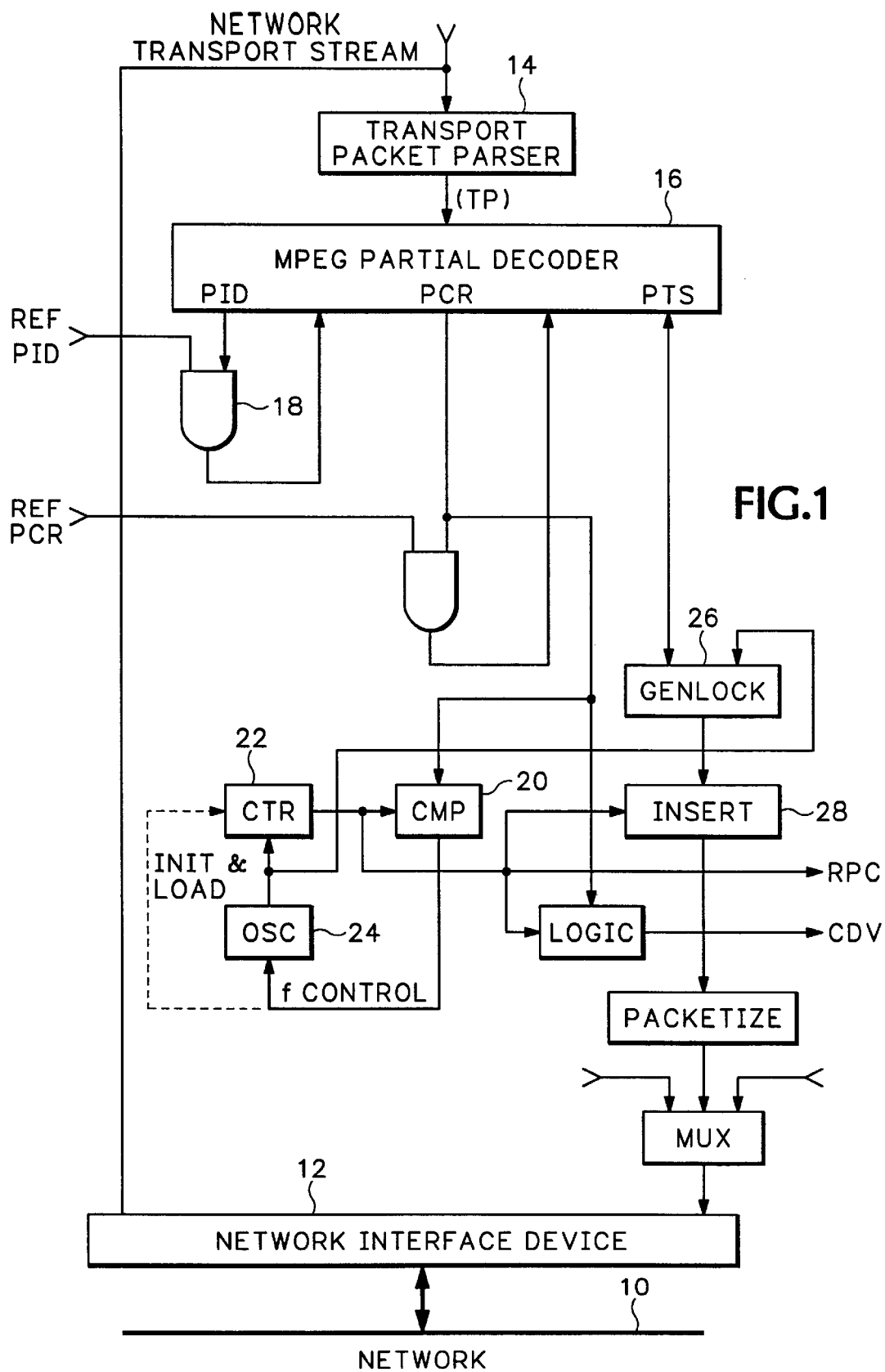
FIG. 1 is a block diagram view of an apparatus for extracting video clock and framing signal information by transport stream snooping according to the present invention.
Figure 2:
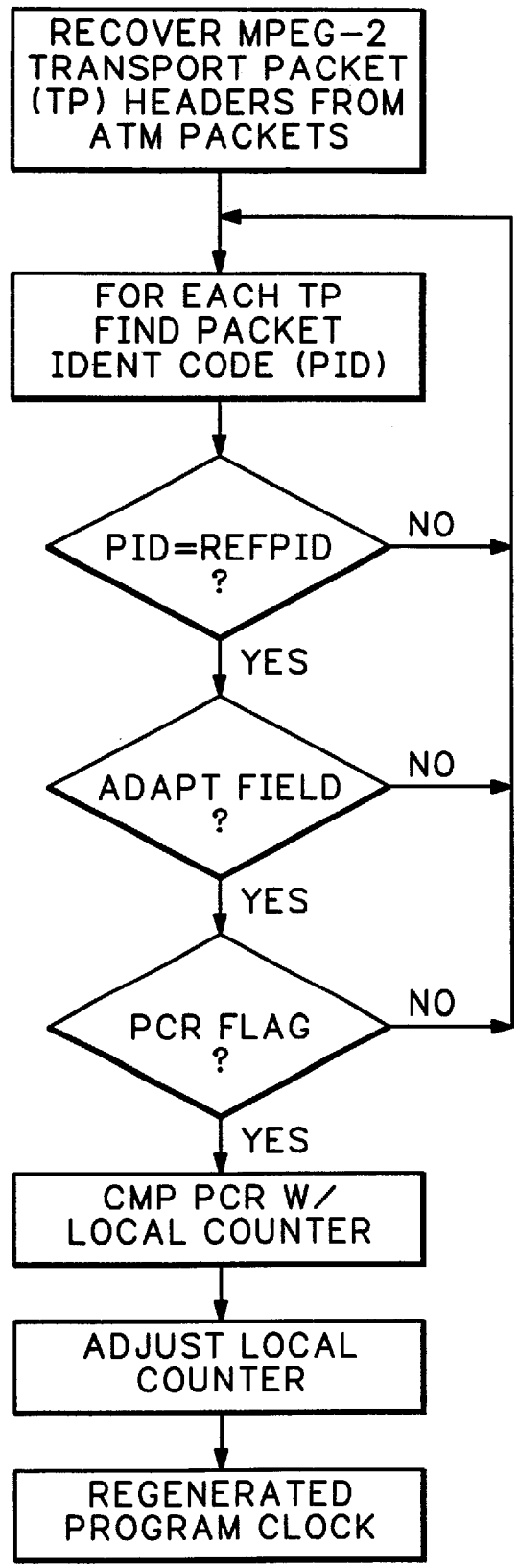
FIG. 2 is a flow chart view of the process for extracting video clock and framing signal information by transport stream snooping according to the present invention.

Referring now to FIG. 1 a network interface device (NID) 12 is coupled for two-way communication with a network 10. The network 10 carries transmission transport streams, such as Asynchronous Transfer Mode (ATM) transmission streams, that include MPEG-2 Transport Streams. The NID 12 couples the transmission transport streams from the network 10 to a transport stream parser 14, which also may receive siteinternally generated transport streams. The transport stream parser 14, as indicated in FIG. 2, recovers MPEG-2 Transport Packet (TP) headers which include a packet identification code (PID). The MPEG-2 TP header is scanned by a MPEG partial decoder 16 for a reference PID by comparing each PID from the TP header with the reference PID in an AND gate 18. TP headers having the reference PID are further scanned by the partial decoder 16 to determine whether the TP header contains an adaptation field, indicated by the value "10" or "11" (binary). If the adaptation field is present and the Program Clock Reference (PCR) flag is set to "1", the PCR code is compared by a comparator 20 with the output of a local counter 22 driven by a local clock oscillator 24 having a finely adjustable frequency. In a fashion similar to phaselock loop design, the result of the comparison, weighted with prior comparisons and perhaps the knowledge of discontinuous events such as start-up or the presence of the discontinuity indicator bit, is output from the comparator 20 for determining the adjustments that should be made to the local counter 22 and/or to the frequency of the local clock oscillator 24.

The PCR counts the "ticks" of a program clock having a nominal frequency of 27.000 MHz. The local counter output provides local count values that on the average differ from the received PCR codes by a nominally constant amount. This regenerated program clock (RPC) is normally used to schedule delivery of decoded "presentation units" containing audio, video or data. The RPC code also may be inserted into a genlock signal. The output from the local clock oscillator 24 is input to a genlock circuit 26 to synthesize the genlock signal as a reference video signal. The genlock signal may be used to synchronize signal sources within a content facility or to resynchronize signals entering or leaving the NID 12 at the content facility interface. The RPC also may be inserted via an inserter 28 into the genlock signal in the same manner as is currently used for vertical interval time codes (VIT-C). Further parsing of the video transport packets belonging to a "Program" containing the PCRs of interest may be done by the partial decoder 16 to decode the Presentation Time Stamps (PTS) used to identify frame boundaries in the video. This information is input to the genlock circuit 26 to generate the offset used to "frame up" the genlock signal.

All of the parsing operations described above may be done without buffering any of the transport data stream—only the results of the parsing need to be stored. Full MPEG decoding is unnecessary, however the portions of a commercial MPEG decoder necessary to accomplish the requisite parsing of the MPEG transport streams may be used for the MPEG partial decoder 16.

The variations in transport delay of individual transmission transport packet cells, called "cell delay variation" (CDV), are a measure of network performance. As traffic on the network increases, CDV may well increase to the point where serious errors may occur in the recovered content due to buffer overflow or underflow. The arrival time of each cell of the transmission transport stream, or some number of cells, represented by the value of the RPC may be stored. If the corresponding operation has been performed at the point where the cells entered the network, these lists may be compared, possibly by sending partial lists of sending and arrival times to the companion NID 12, in order to assess the network performance.

Thus the present invention provides for video clock and framing signal extraction by transport stream "snooping"—extracting MPEG transport packet headers, scanning for program clock reference data, and then comparing the program clock reference data with a local counter to adjust a recovered program clock oscillator, which recovered program clock is used for facility timing and together with framing information from the MPEG data is used to generate a framed up genlock signal.

What is claimed is:

1. An apparatus for recovering a video clock from a transport stream containing digital data including MPEG Transport Packets without buffering any of the transport stream digital data and without full MPEG decoding comprising:

means for extracting MPEG Transport Packet headers from the digital data transport stream;

means for partially parsing from the MPEG Transport Packet headers which have a reference packet identification code only a program reference clock and a presentation time stamp;

means for comparing the program reference clock with a local clock to generate a recovered program clock; and means for generating from the presentation time stamp and the local clock the video clock.

2. The apparatus as recited in claim 1 wherein the partially parsing means comprises:

means for identifying the MPEG Transport Packet headers having the reference packet identification code; and means for extracting the program reference clock from an appropriate one of the identified MPEG Transport Packet headers.

3. The apparatus as recited in claim 1 wherein the comparing means comprises:

an oscillator operating at a nominal frequency and having a control input, the oscillator providing the local clock as an output;

a counter having the local clock as an input and the recovered program clock as an output; and a comparator having the recovered program clock and program reference clock as inputs to generate a control signal that is coupled to the control input of the oscillator to finely tune the oscillator.

4. The apparatus as recited in claim 3 wherein the generating means comprises a genlock circuit having the local clock signal and the presentation time stamp as inputs and providing the video clock as an output.

\* \* \* \* \*